Figure 1:
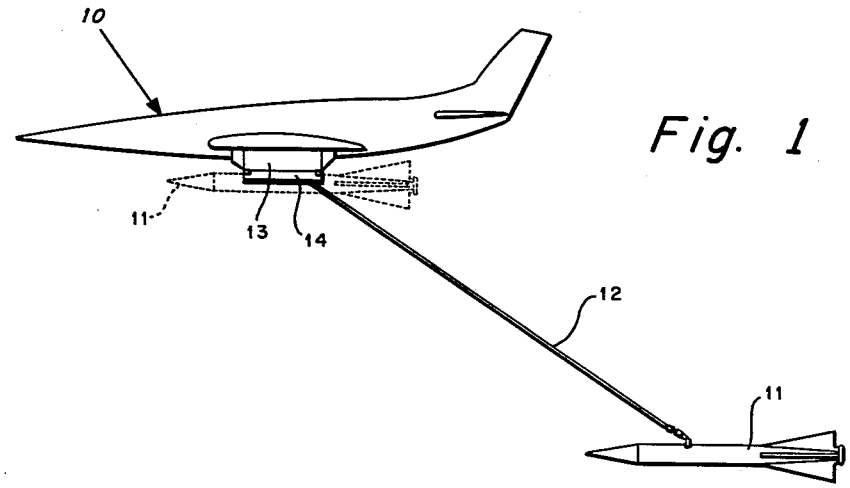

Aug. 6, 1963   E. J. McQUILLEN ET AL   3,100,093
APPARATUS FOR TOWED AIRCRAFT
Filed Aug. 28, 1962   2 Sheets-Sheet 1

INVENTORS
EDWARD J. McQUILLEN
FRANCIS X. MURPHY
BY
AGENT

Aug. 6, 1963   E. J. McQUILLEN ET AL   3,100,093
APPARATUS FOR TOWED AIRCRAFT
Filed Aug. 28, 1962   2 Sheets-Sheet 2

INVENTORS
EDWARD J. McQUILLEN
FRANCIS X. MURPHY
BY
AGENT

United States Patent Office
3,100,093
Patented Aug. 6, 1963

3,100,093
APPARATUS FOR TOWED AIRCRAFT
Edward J. McQuillen, Huntingdon Valley, and Francis X. Murphy, Philadelphia, Pa., assignors to the United States of America as represented by the Secretary of the Navy
Filed Aug. 28, 1962, Ser. No. 220,099
10 Claims. (Cl. 244—3)
(Granted under Title 35, U.S. Code (1952), sec. 266)

The invention described herein may be manufactured and used by or for the Government of the United States of America for governmental purposes without the payment of any royalties thereon or therefor.

The present invention relates to a high-speed towed aircraft, and more particularly to apparatus for launching, retrieving and securing a towed aircraft over a wide range of altitudes and airspeeds with a high-performance airplane.

The supersonic speed capabilities of modern high-performance airplanes has necessarily introduced new techniques and designs in towed aircraft such as targets, aero-capsules, drogues and the like. At these high speeds, smooth flight of the towed aircraft becomes increasingly more difficult and the more recently recognized center of gravity connected towed aircraft have been given preference over the well-known nose-towed aircraft. Such an aircraft, hereinafter referred to as CG-towed aircraft, is disclosed in U.S. Patent No. 3,030,111 to W. B. Hendershott for Aerial Target, issued April 17, 1962. Notwithstanding such advantages as lower drag, lower towline tension, and greater stability in high-speed operations, the CG-towed aircraft did not satisfy all requirements because the existing modes of launching, retrieving and securing towed aircraft were grossly and dangerously inadequate. A fundamental objective for aerodynamic stability of towed aircraft is to allow it to assume a natural attitude into the wind known as weathercocking with minimum influence or disturbance from the towline to which it is connected. The CG-towed aircraft most nearly achieves this goal, but it is extremely responsive to turbulent air conditions. CG-towed aircraft also necessarily require a towline connection from the side of the aircraft. The combination of high response to turbulence and the side connection made launching, retrieving and securing operations dangerous and unreliable. It was often necessary for the pilot to reduce speed and attempt to bounce the towed aircraft into place under the airplane by maneuvering under directions of a chase plane observer. Occasionally the towline would break or projections on the towing airplane would crush the side of the nearly retracted aircraft. In other instances it became necessary to cut the towline and jettison the towed aircraft.

Accordingly, it is an object of the present invention to provide a novel launching, retrieving and securing apparatus for a side-connected towed aircraft from an airplane operating over wide ranges of speed and altitude, in which the towed aircraft can weathercock to relieve air loads irrespective of ambient turbulence, in which the towed aircraft can be quickly retrieved and secured to the towing airplane with high reliability, and in which positive securement permits the use of relatively heavier towed aircraft in catapult takeoffs and arrested landings of a carrier-based towing airplane.

Another object is to provide an improved connection between the towline and the towed aircraft for removing all stresses from the towline when the towed aircraft is in the secured position, in which the towline may trail from the towing airplane with wide variations in droop caused by different speeds and altitudes, and in which positive latching is provided in the securement to insure against breaking the towline.

Still another object is to provide a relatively simple launching, retrieving and securing apparatus for towed aircraft which is inexpensive to manufacture, lightweight and low in maintenance and repair costs.

Various other objects and advantages will appear from the following description of one embodiment of the invention, and the most novel features will be particularly pointed out hereinafter in connection with the appended claims.

Figure 2:
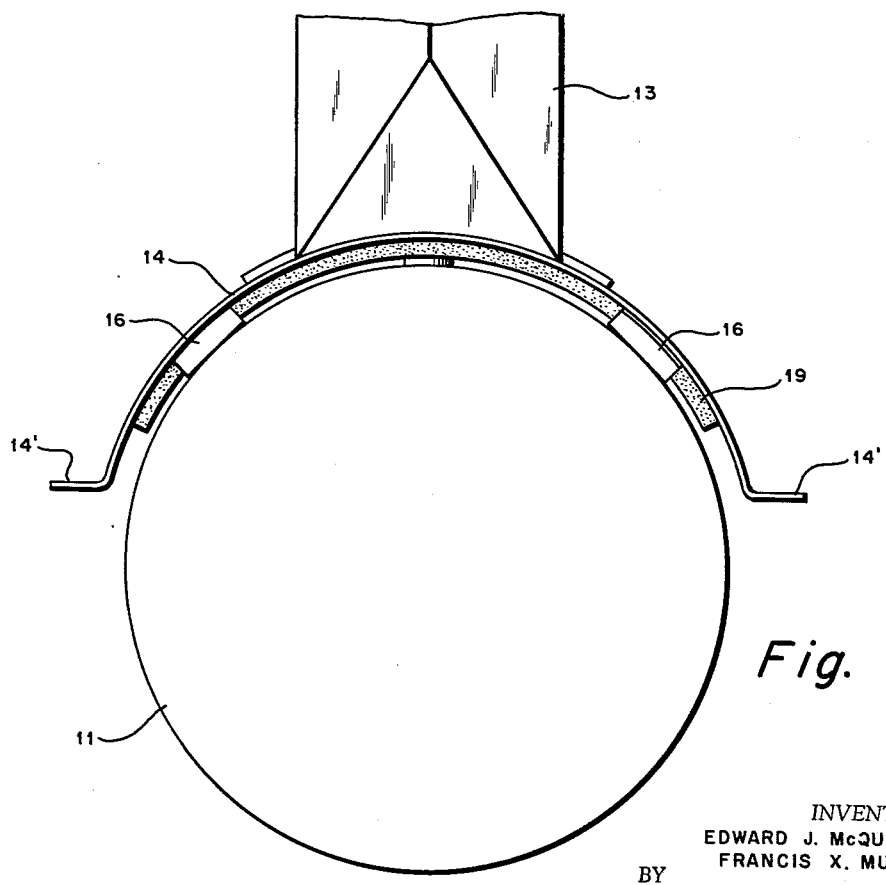
Figure 3:
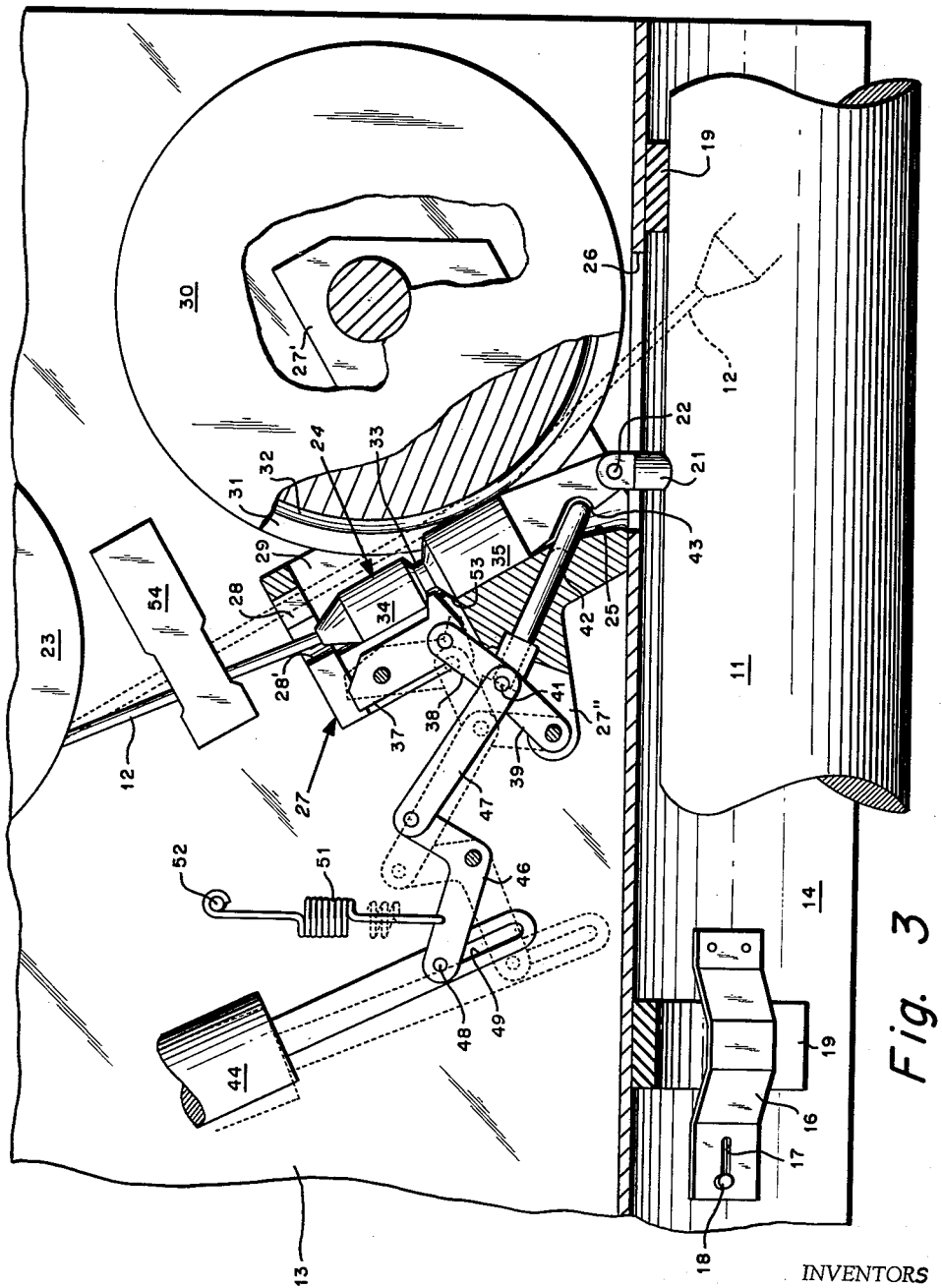

In the drawings:
FIG. 1 is a pictorial representation in elevation of the present invention in actual flight conditions;
FIG. 2 represents a front view of the lower portion of the launching, retrieving and securing apparatus with the towed aircraft secured therein; and
FIG. 3 represents enlarged, fragmentary side view of the launching, retrieving and securing apparatus with the port fairing removed to show component details therein.

In the illustrated embodiment of the invention, a high performance airplane indicated generally by the numeral 10 in FIG. 1, is shown in horizontal flight towing a CG-type aircraft 11 of circular transverse configuration by means of a towline 12 connected therebetween. It is contemplated that the airplane 10 be capable of flying over a wide range of altitudes and speeds including supersonic. For convenience of illustration, only a small portion of the total length of towline 12 is shown extended or payed-out, the rest being reeled within a fairing 13 conveniently fixed beneath the aircraft 10 to rigid airplane structure such as a wing. FIG. 1 also illustrates, in dotted outline, the position of the towed aircraft when secured.

As best seen in FIG. 2, the bottom of the fairing 13 supports an elongated and inverted saddle 14 affixed thereto and having a substantially semicircular transverse configuration with the radial axis centered beneath the fairing 13 along the length thereof. The radius of curvature of the saddle 14 is sufficient to form a lower concave surface concentric with the top surface of the towed aircraft when in the secured position. Of course the invention is not limited to a particular towed aircraft configuration, and accordingly the saddle 14 may take any shape suitable for the particular aircraft to be towed. To utilize a thin-gauge plate material for the saddle 14, still retaining high rigidity along the sides thereof, the edges are turned laterally outward to form stiffeners 14'. The towed aircraft 11 is held in spaced concentric relationship with the saddle 14 by two pairs of leaf type springs 16, each pair being respectively positioned near the fore and aft portions of the saddle 14. The springs 16 of each pair are further equiangularly displaced on opposite sides of the radial axis of the saddle 14 and are oriented along the length of the saddle 14. Each spring 16 is fixed at one end to the saddle 14 and the other end forms a longitudinally disposed slot 17 operatively engaging a stud 18 projecting from the lower surface of the saddle 14. The raised middle portion of each spring 16 extends radially inward from the concave surface of the saddle 14 an amount sufficient to maintain the aircraft 11 in spatial relationship under ordinary load conditions. Any deflection of the raised portion of the spring 16 caused by the aircraft 11 will permit the slotted end to slide along the pin 18. Each spring 16 thus provides initial and often complete damping of the aircraft 11 whenever ambient turbulence tends to oscillate the aircraft 11. The springs 16 also permit small variations in attitude or weathercock of the aircraft 11 relative to the saddle 14 due to changes in airflow. Backup damping and shock absorbing is provided by the further inclusion of strip pads 19 contiguously fastened to the concave surface of the saddle 14 near the fore and aft ends and extending beneath each pair of springs 16. The pads 19 may be composed of a resilient material such as foam rubber whereby the most severe pitch and yaw oscillations will be completely damped.

Intermediate of the ends and extending from the top side of the towed aircraft 11, a clevis 21 and clevis pin 22 provide a normally horizontal pivotal connection perpendicular to the length of the towed aircraft 11. The position of the clevis 21 along the length of the CG-towed aircraft 11 is at or near the longitudinal position of the center of gravity thereof. Of course, it is contemplated that the clevis 21 may be located at any other position along the top of the aircraft 11 without departing from the spirit of this invention. For example, the clevis 21 may be located close to the forward end and still insure positive securement.

The towline 12 is stored on a motorized reel or winch 23 controlled from the towing airplane 10 in any convenient manner. The outboard end of the towline 12 is connected to one end of a generally cylindrical coupling or so-called swivel, indicated generally by the numeral 24, with the latter being pivotally connected at the other end on the clevis pin 22. In the secured position, the swivel 24 extends into the fairing 13 through an opening 26 in the saddle 14 and is completely received in a support housing indicated generally by the numeral 27. The housing 27 is fixed relative to the fairing 13 and the saddle 14 and includes a funnel-like opening 25 adjacent to the opening 26 for guiding the swivel 24 into the secured position within the housing 27 and a slot-like opening 28 at the opposite end to guide the towline 12 therethrough. The opening 28 further includes radial grooves 28' to provide uniform clearance between the upper ends of the housing 27 and the secured swivel 24. The towline or upper end of the swivel 24 is tapered to insure smooth and uninterrupted insertion. The internal configuration of the housing 27, which communicates between the openings 25 and 28 is formed to provide a limited sliding surface for the swivel 24 and to constrain the swivel 24 against forward and lateral motion. The aftward side of the housing 27 includes another opening 29 which receives a circular segmental portion of a sheave 30. The sheave 30 is rotatably connected to a sheave-mounting extension 27' of the housing 27 on an axis normal to the length of the fairing 13. The sheave 30 includes a dual-depth circumferential groove formed by a first groove 31 with the same radius of curvature as the maximum radius of the swivel 24 and a second groove 32 formed at the root of the groove 31 for receiving the towline 12. The sheave axis is positioned so that a positive rolling contact is obtained against the swivel 24 and so that swivel constraint is also provided against aftward motion. The groove 32 becomes effective as a frictionless guide for the towline 12 during pay out or retrieving over wide variations in trailing angles. The towline position under this last condition is shown in dotted outline in FIG. 3. In the illustrated embodiment, the support housing 27 is inclined forwardly from the saddle opening 26 about 30 degrees but it may be varied to suit design and actual flight conditions without departing from the spirit of the invention.

Positive securement of the swivel 24 in the support housing 27 is achieved by a latch and toggle arrangement now to be described. The swivel 24 includes an annular V-notch 33 intermediate the ends thereof forming thereby an upper land 34 and a lower land 35. The V-notch 33 is positioned along the length of the swivel 24 to receive the tongue of a pawl 37 when the swivel 24 is fully inserted in the housing 27. The pawl 37 is pivotally connected in the housing 27 for articulation from a "latch" position, shown in solid lines, to an "unlatch" position shown in phantom. The movable end of the end pawl 37 is connected to an over-center toggle mechanism comprising linkages 38 and 39 commonly connected by a floating toggle pin 41. The other end of the toggle link 39 is pivotally connected to an extension arm 27" of the housing 27.

The "latch" position of the floating toggle pin 41 can be moved to the "unlatch" position from two separate and distinct operators. In the first instance, a cocking plunger 42 pivotally connected at one end to the toggle pin 41 slidably extends into the housing 27 and occludes a portion of the funnel opening 25 and further extends into a sawtooth-type notch 43 near the pivoted end of the swivel 24 when the latter is fully inserted. It should now be apparent that when the swivel 24 commences to enter the housing 27, its beveled end first engages the cocking plunger 42 and the toggle mechanism will rotate the pawl 37 to the "unlatch" position. The occluding end of the plunger 42 is sufficiently chamfered to prevent it from dropping back into the V-notch 33, and the sawtooth notch 43 is positioned along the length of the swivel 24 to prevent the pawl 37 from returning to the "latch" position until complete insertion is attained.

In the second instance, the "unlatch" position is effected by a linearly actuating motor 44 controlled remotely by means not shown. The motor 44 is kinematically connected through a bellcrank 46 and connecting link 47 to the toggle pin 41, the bellcrank 46 being connected at its middle pivot to the fairing 13. A lost-motion connection between the bellcrank 46 and the motor 44 is provided by means of a pin 48 and slot 49. Hence, "unlatch" actuation by the cocking plunger 42 is effective although the motor 44 normally remains in a "latch" position. A latch spring 51 connected between one arm of the bellcrank 46 and a fairing-fixed pin 52 provides a positive bias on the cocking plunger 42 and the pawl 37 toward the "latch" position.

The fully inserted or the upward travel of the swivel 24 in the housing 27 is limited. It will be observed that the upper land 34 is slightly reduced in diameter relative to the lower land 35 forming thereby an annular shoulder on the lower surface of the V-notch 33. A mating step 53 in the housing 27 abuts the so-formed shoulder on full insertion of the swivel 24. Step 53 is positioned along the length of the housing to allow slight overtravel of the upper surface of the V-notch 33 to insure complete engagement of the pawl 37.

A remotely actuated towline cutter 54 is fixed within the fairing 13 for jettisoning the towed aircraft 11 in case of emergency.

The launching, retrieving and securing of a towed aircraft in accordance with the present invention should now be apparent. Launching is initiated by momentary actuation of the motor 44 to the "unlatch" position shown in dotted lines. The toggle mechanism thereby moves to the "unlatch" position against the force of the spring 51 to retract pawl 37 and plunger 42 from engagement with the swivel 24. The drag load on the towed aircraft 11 is transferred to the towline 12 and the winch 23. Motor or appropriate brake control, not shown, controls the rate of towline pay out for the desired distance between the airplane 10 and aircraft 11. As the swivel 24 leaves the housing 27, rolling contact provided by the sheave 29 is transferred from the groove 31 to the groove 32 thus insuring substantially frictionless pay out of the towline 12 irrespective of the exit angle of the towline 12 at the opening 26.

For retrieving and securing it is only necessary that the winch 23 reel in the towline 12. As the beveled towline end of the upper land 34 pushes against the cocking plunger 42 and the bias of spring 51, pawl 37 is unlatched. The winch 23 continues pulling the swivel 24 upward until the lower surface of the V-notch 33 abuts the shoulder 53. The pawl 37 and the plunger 42 are thereby returned to the "latch" position; and when the driving torque of the winch 23 terminates, swivel 24 will backslide slightly under the weight of the aircraft 11 and the force of springs 16 until the pawl 37 engages the upper side of the V-notch 33. In this final position, ample compliance is provided by the springs 16 to permit substantial weathercocking of the aircraft 11 and prevent high air loads.

Many of the advantages are gained from the present invention. For example, it affords a floating or self-aligning aircraft securement to permit weathercocking and avoid air loads which can otherwise become very high if the aircraft is constrained in one fixed attitude. This is particularly important for supersonic CG-towed aircraft configurations. The invention also provides greater reliability of securement under turbulent airflow conditions, for large variations in towline exit angles, and for wide ranges of air speed and altitude.

It will be understood that various changes in the details, materials, steps and arrangement of parts which have been herein described and illustrated in order to claim the nature of the invention, may be made by those skilled in the art within the principle and scope of the invention as expressed in the appended claims.

What is claimed is:

1. A launching, retrieving and securing apparatus for towing an aircraft, comprising: a fairing formed to be fixed to the underside of a towing airplane, motorized reel contained in said fairing adapted to be controlled from a remote station, a towline connected at one end thereof to said reel, swivel means connected to the other end of said towline and formed to be pivotally connected to the normally disposed topside of the towed aircraft, saddle means formed on the bottom of said fairing to nestle the topside of the towed aircraft when in a secured position, a plurality of resilient means secured to the lower surface of said saddle means for providing compliance between said saddle means and the towed aircraft in the secured position, said saddle means forming an opening for admitting said towline and said swivel means into said fairing, a support housing fixed within and to said fairing adjacent to said opening for slidably receiving said swivel means, said support housing being formed therein to constrain said swivel means against forward and lateral motion when in the secured position, sheave means rotatably connected to said support housing having the sheave groove thereof tangentially abutting said swivel means when in the secured position to constrain the latter against aftward motion and to provide rolling contact for said towline during launching and retrieving, a notch formed in said swivel means, pawl means pivotally connected within and to said support housing for normally latching into said notch when said swivel means is in the secured position, toggle means operatively connected between said pawl means and said support housing, cocking plunger means retractably extending into said support housing and pivotally connected at one end to said toggle means for actuation thereof, the other end of said plunger means normally obstructing the admission of said swivel means into said housing, actuating means connected within and to said fairing adapted to be controlled from the remote station, lost-motion means operatively connected between said actuating means and said toggle means, and force-exerting means operatively connected between said fairing and said toggle means for maintaining said pawl means and said plunger means in latching and obstructing positions respectively; whereby positive securement of the towed aircraft can be obtained irrespective of ambient turbulence, airspeed and altitude.

2. Apparatus as set forth in claim 1 further comprising: upper and lower cylindrical lands in said swivel means at opposite edges of said notch, said upper land being of reduced diameter relative to said lower land, said support housing including a raised surface therein positioned to admit said upper land and to abut said lower land at said notch for limiting the insertion of said swivel means, and a recess formed in said swivel means receiving the other end of said plunger means in the secured position.

3. A launching, retrieving and securing apparatus for towing an aircraft, comprising: a fairing formed to be fixed to the underside of a towing airplane and formed on the bottom of said fairing to nestle the topside of the towed aircraft when in a secured position, motorized reel contained in said fairing adapted to be controlled from a remote station, a towline connection at one end thereof to said reel, swivel means connected to the other end of said towline and formed to be pivotally connected to the normally disposed topside of the towed aircraft, a plurality of resilient means secured to the bottom of said fairing for providing attitude compliance to the towed aircraft in the secured position, said fairing forming an opening for admitting therein said towline and said swivel means, support means fixed adjacent to said opening for receiving said swivel means and formed therein to constrain said swivel means against forward and lateral motion when in the secured position, sheave means rotatably fixed in said fairing having the sheave groove thereof tangentially abutting said swivel means when in the secured position to constrain the latter against aftward motion and to provide rolling contact for said towline during launching and retrieving, a notch formed in said swivel means, pawl means normally latching into said notch when said swivel means is in the secured position, cocking means retractably extending into said support housing and operatively connected to said pawl means for actuation thereof and normally obstructing the admission of said swivel means into said support means, remote-controlled actuating means connected to said fairing, lost-motion means operatively connected between said actuator and said pawl means, force-exerting means operatively connected between said fairing and said pawl means for maintaining said pawl means and said plunger means in latching and obstructing positions respectively; whereby positive securement of the towed aircraft can be obtained irrespective of ambient turbulence, airspeed and altitude.

4. Apparatus as set forth in claim 3 further comprising: upper and lower cylindrical lands in said swivel means at opposite edges of said notch, said upper land being of reduced diameter relative to said lower land, said support means including a raised surface therein positioned to admit said upper land and to abut said lower land at said notch for limiting the insertion of said swivel means, and a recess formed in said swivel means receiving said other end of said cocking means in the secured position.

5. Apparatus for towing a CG-type aircraft, comprising: remote-controlled reel means adapted to be contained in a towing airplane, a towline connected at one end thereof to said reel, coupling means connected to the other end of said towline and formed to be pivotally connected to the normally disposed topside and near the center of gravity of the towed aircraft, saddle means formed on the underside of the airplane to nestle the topside of the towed aircraft and forming an opening for admitting said towline and said coupling means, resilient means secured to said saddle means for providing compliance between the towing airplane and the towed aircraft when secured thereto, support means fixed to said saddle adjacent to the opening for receiving said coupling means to constrain said coupling means against motion, latch means operatively connected to said support means for normally latching said coupling means in the secured position, first unlatching means operatively connected to said latch means for release thereof upon admission of said coupling means into said support means, second unlatching means contained in the airplane and adapted to be remotely controlled, lost-motion means operatively connected between said second unlatching means and said latch means, and force-exerting means operatively connected to said latch means for yieldingly maintaining said latch means and said first unlatching means in a latching position; whereby positive securement of the towed aircraft can be obtained irrespective of ambient turbulence, airspeed and altitude.

6. Apparatus for towing a side-connected aircraft, comprising: remote-controlled reel means adapted to be contained in a towing airplane, a towline connected at one end thereof to said reel, coupling means connected to the other end of said towline and formed to be pivotally connected to the normally disposed topside of the towed aircraft, saddle means formed on the underside of the airplane to nestle the topside of the towed aircraft and forming an opening for admitting said towline and said coupling means, resilient means secured to said saddle means for providing compliance between the towing airplane and the towed aircraft when secured thereto, support means fixed to said saddle adjacent to the opening for receiving said coupling means to constrain said coupling means against motion, latch means operatively connected to said support means for normally latching said coupling means in the secured position, first unlatching means operatively connected to said latch means for release thereof upon admission of said coupling means into said support means, second unlatching means contained in the airplane and adapted to be remotely controlled, lost-motion means operatively connected between said second unlatching means and said latch means, and force-exerting means operatively connected to said latch means for yieldingly maintaining said latch means and said first unlatching means in a latching position; whereby positive securement of the towed aircraft can be obtained irrespective of ambient turbulence, airspeed and altitude.

7. Latch mechanism for securing a towed aircraft to an airplane, comprising: substantially cylindrical swivel means adapted to be connected at one end to a towline and to be pivotally connected to the normally disposed topside of the towed aircraft on a transverse axis thereto, a receiver means adapted to be fixed to a towing airplane for slidably and rotationally receiving said swivel means and formed therein to constrain said swivel means against forward and lateral motion when secured therein, sheave means rotatably connected to said receiver means having the sheave groove therein tangentially abutting said swivel means in the secured position to constrain the latter against aftward motion and to provide rolling contact for said towline during launching and retrieving, an annular notch formed in said swivel means, pawl means pivotally connected within and to said receiver means for normally latching into said notch when said swivel means is in the secured position, toggle means operatively connected between said pawl means and said receiver means, cocking plunger means retractably extending into said receiver means and pivotally connected at one end to said toggle means for actuation thereof, the other end of said plunger means normally obstructing the admission of said swivel means into said receiver means, actuating means adapted to be connected in the towing airplane and controlled from a remote station, a lost-motion means operatively connected between said actuating means and said toggle means, and force-exerting means operatively connected to said toggle means for maintaining said pawl means and said plunger means in latching and obstructing positions respectively; whereby positive securement of the towed aircraft can be obtained irrespective of pitch and yaw.

8. Apparatus as set forth in claim 7 further comprising: upper and lower cylindrical lands in said swivel means at opposite edges of said notch, said upper land being of reduced diameter relative to said lower land, said receiver means including a raised surface therein positioned to admit said upper land and to abut said lower land at said notch for limiting the insertion of said swivel means, and a recess formed in said swivel means receiving said other end of said plunger means in the secured position.

9. Latch mechanism for securing a towed aircraft to an airplane comprising: substantially cylindrical coupling means adapted to be connected at one end to a towline and to be pivotally connected to the normally disposed topside of the towed aircraft on a transverse axis thereto, a receiver means adapted to be fixed to a towing airplane for slidably and rotationally receiving said coupling means in a secured position, an annular notch formed in said coupling means, pawl means pivotally connected within and to said receiver means for normally latching into said notch when said coupling means is in the secured position, toggle means operatively connected between said pawl means and said receiver means, unlatching means slidably extending into the opening of said receiver means and pivotally connected to said toggle means for actuation thereof when said coupling means commences to be inserted into said receiver means, and force-exerting means operatively connected to said toggle means for maintaining said pawl means in a latching position; whereby positive securement of the towed aircraft can be obtained irrespective of pitch and yaw.

10. Mechanism as set forth in claim 9 further comprising: upper and lower cylindrical lands in said coupling means at opposite edges of said notch, said upper land being of reduced diameter relative to said lower land, and said receiving means including a raised surface therein positioned to admit said upper land and to abut said lower land at said notch for limiting the insertion of said coupling means.

References Cited in the file of this patent
UNITED STATES PATENTS

| | | |
|---|---|---|
| 2,199,588 | Cobham et al. | May 7, 1940 |
| 2,848,179 | Troxell et al. | Aug. 19, 1958 |
| 2,953,442 | Hopper et al. | Sept. 20, 1960 |
| 2,959,416 | Baldwin | Nov. 8, 1960 |